(12) United States Patent
Barton et al.

(10) Patent No.: US 11,576,180 B2
(45) Date of Patent: Feb. 7, 2023

(54) RESOURCE UNIT ALLOCATION IN MESH NETWORKS

(71) Applicant: Cisco Technology, Inc., San Jose, CA (US)

(72) Inventors: Robert E. Barton, Richmond (CA); Vishal S. Desai, San Jose, CA (US); Jerome Henry, Pittsboro, NC (US)

(73) Assignee: Cisco Technology, Inc., San Jose, CA (US)

( * ) Notice: Subject to any disclaimer, the term of this patent is extended or adjusted under 35 U.S.C. 154(b) by 274 days.

(21) Appl. No.: 16/809,227

(22) Filed: Mar. 4, 2020

(65) Prior Publication Data

US 2021/0282144 A1  Sep. 9, 2021

(51) Int. Cl.
*H04W 72/04* (2009.01)
*H04W 72/10* (2009.01)
*H04W 84/18* (2009.01)

(52) U.S. Cl.
CPC ....... *H04W 72/0486* (2013.01); *H04W 72/10* (2013.01); *H04W 84/18* (2013.01)

(58) Field of Classification Search
CPC .. H04L 47/78; H04L 47/782; H04W 72/0486; H04W 72/10; H04W 84/18
See application file for complete search history.

(56) References Cited

U.S. PATENT DOCUMENTS 6,590,928 B1 * 7/2003 Haartsen ............... H04W 84/20
375/137
7,849,216 B2   12/2010 Gong et al.
7,990,863 B2    8/2011 Yagyu et al.
(Continued)

FOREIGN PATENT DOCUMENTS

CN   1719931 A    1/2006
EP   1615388 A1   1/2006
(Continued)

OTHER PUBLICATIONS

Xu, Dechen; She, Huimin; Fang, Xiang; Li, Chuanwei; and Yang, Xueying, "Concurrent Transmission Mechanism to Improve Throughput of Bottleneck Devices in Low-Power and Lossy Networks", Technical Disclosure Commons, ( Jul. 24, 2018).
(Continued)

*Primary Examiner* — Khoa Huynh
(74) *Attorney, Agent, or Firm* — Patterson + Sheridan, LLP (57) ABSTRACT

Resource Unit (RU) allocation in mesh networks is provided via identifying devices engaged in wireless communication over a shared channel in a mesh network, the devices including a first Access Point (AP), a second AP in wireless communication with the first AP via a first backhaul connection, and a third AP in wireless communication with the first AP via a second backhaul connection; determining a first demand for bandwidth in the shared channel over the first backhaul connection and a second demand for bandwidth over the second backhaul connection; and assigning RUs to the first backhaul connection based on the first demand relative to a total bandwidth demand within the shared channel and to the second backhaul connection based on the second demand relative to the total bandwidth demand the shared channel, wherein the total bandwidth demand includes the first demand and the second demand.

20 Claims, 7 Drawing Sheets

(56) References Cited

U.S. PATENT DOCUMENTS

| | | | |
|---|---|---|---|
| 9,072,092 B1* | 6/2015 | Gunasekara | H04W 28/16 |
| 10,348,572 B1 | 7/2019 | Zheng et al. | |
| 10,440,713 B2 | 10/2019 | Gunasekara et al. | |
| 2005/0052992 A1* | 3/2005 | Cloonan | H04L 67/54 |
| | | | 348/E7.063 |
| 2006/0019673 A1 | 1/2006 | Yagyu et al. | |
| 2008/0069059 A1 | 3/2008 | Yagyu et al. | |
| 2009/0109855 A1* | 4/2009 | Gong | H04W 16/10 |
| | | | 370/465 |
| 2011/0069686 A1* | 3/2011 | Raman | H04L 12/413 |
| | | | 370/445 |
| 2015/0271826 A1 | 9/2015 | Gunasekara et al. | |
| 2017/0347357 A1 | 11/2017 | Gunasekara et al. | |
| 2019/0280934 A1 | 9/2019 | Zheng et al. | |
| 2019/0394777 A1 | 12/2019 | Gunasekara et al. | |

FOREIGN PATENT DOCUMENTS

| | | | |
|---|---|---|---|
| JP | 2006050549 A | 2/2006 | |
| KR | 20060049894 A | 5/2006 | |
| TW | 200616381 A | 5/2006 | |
| WO | 2008112664 A1 | 9/2008 | |
| WO | 2013138521 A1 | 9/2013 | |
| WO | 2019143380 A1 | 7/2019 | |

OTHER PUBLICATIONS

Lu et al., "A Cross-layer Design for End-to-End on Demand Bandwidth Allocation in Infrastructure Wireless Mesh Networks," International Conference on Wireless Algorithms, Systems and Applications, 8 pgs, 2007.

Sanjeev Jain Vijay Shanker Tripathi,and Sudarshan Tiwari, "Bandwidth Allocation Based on Traffic Load and Interference in IEEE 802.16 Mesh Networks," Research Article | Open Access | vol. 2013 |Article ID 197295 | 7 pages | Received Nov. 26, 2012.

PCT Notification of Transmittal of the International Search Report and the Written Opinion of the International Searching Authority, or the Declaration for Application PCT/US2021/070229 dated Jun. 29, 2021.

* cited by examiner

RESOURCE UNIT ALLOCATION IN MESH NETWORKS

TECHNICAL FIELD

Embodiments presented in this disclosure generally relate wireless network management. More specifically, embodiments disclosed herein provide for demand-based bandwidth management in mesh networks.

BACKGROUND

In a mesh network, several devices share one channel and contend for access to the shared channel so that only one device transmits signals at any given time. This can lead to build-up of data in the buffers of the devices, especially in the devices that are given lower priority in contention or that receive data from multiple devices. Accordingly, various bottlenecks for traffic flow can develop at one or more Access Points (APs) in the mesh network, particularly as the size and the complexity of the mesh network grows.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

One embodiment presented in this disclosure provides a method comprising: identifying devices engaged in wireless communication over a shared channel in a mesh network, the devices including a first Access Point (AP), a second AP in wireless communication with the first AP via a first backhaul connection, and a third AP in wireless communication with the first AP via a second backhaul connection; determining a first demand for bandwidth in the shared channel over the first backhaul connection and a second demand for bandwidth over the second backhaul connection; and assigning Resource Units (RUs) to the first backhaul connection based on the first demand relative to a total bandwidth demand within the shared channel and to the second backhaul connection based on the second demand relative to the total bandwidth demand the shared channel, wherein the total bandwidth demand includes the first demand and the second demand.

One embodiment presented in this disclosure provides a mesh network operating on a shared channel, including: a root Access Point (RAP) connected to a wireless controller; a first Mesh Access Point (MAP) in direct communication with: the RAP via a first backhaul connection; a first user equipment device (UED) associated with the first MAP via a first access connection; and a second UED associated with the first MAP via a second access connection; a second MAP in direct communication with: the RAP via a second backhaul connection; and wherein the wireless controller is configured to: assign Resource Units (RUs) for the first backhaul connection, the second backhaul connection, the first access connection, and the second access connection based on relative transmission needs for individual connections of the first backhaul connection, the second backhaul connection, the first access connection, and the second access connection relative to a total bandwidth demand including the first backhaul connection, the second backhaul connection, the first access connection, and the second access connection.

One embodiment presented in this disclosure provides a Wireless Local Area Network (LAN) Controller (WLC), comprising: a processor; and a memory storage device including instructions that when executed by the processor enable the WLC to: receive demand information from a plurality of Access Points (APs) comprising a mesh network; and assign Resource Units (RU) to the plurality of APs based on the demand information and individual bandwidth demands from individual APs of the plurality of APs relative to a total bandwidth demand from the plurality of APs.

Example Embodiments

The present disclosure provides for managing how to distribute bandwidth in a mesh network. In various embodiments, the present disclosure allows for a more needs-based distribution of networking resources that results in fewer bottlenecks, and the potential for larger scale deployments of mesh networks. By assigning Resource Units (RUs) within the available channels based on demand, bandwidth can be fairly assigned deep within the mesh network. For example, the RU space can be divided between various connections based on the expected amount of traffic over the individual connection, and the RU space may be re-divided periodically, (e.g., every X milliseconds/seconds/minutes), in response to a device joining/leaving the mesh network (or another event), or an observed load (e.g., a buffer status report indicating that a device's buffers are filling up) so that network resources are fairly distributed throughout the mesh network.

As discussed herein, an RU describes a portion of wireless spectrum that is won or assigned for communications by a given device during a given period of time. An RU may be used for uplink communications, downlink communications, or both (e.g., duplex communications) based on the needs of the device having won or been assigned the RU. As the several devices in a mesh network use a shared channel of the wireless spectrum for communication, an RU may designate all or a portion of the available spectrum of the selected channel in a given time to one or more devices.

Sub-portions of the channel or spectrum may be assigned to different devices for different purposes (e.g., uplink versus downlink), and various communications standards and/or channels may allow for different numbers of sub-portions to be used at a given time. Although the present disclosure generally provides examples for RUs of an unspecified time length or unspecified number of sub-channels or subcarriers (in which a given RU may be a different length of time or different number of sub-channels than a subsequent RU), the present disclosure is applicable to networking standards or deployments in which a specified time length or a specified number of sub-channels or subcarriers is applied to all or some of the RUs.

In addition to the payload of data being transmitted, an RU may include various defined portions related to guard intervals, inter-frame spacing, error correction/mitigation, and the like, and one of ordinary skill in the art will be able to format the RU according to the relevant communications standard. Accordingly, the present disclosure contemplates RUs that are assigned and formatted according to various schemes and communications standards.

Figure 1:
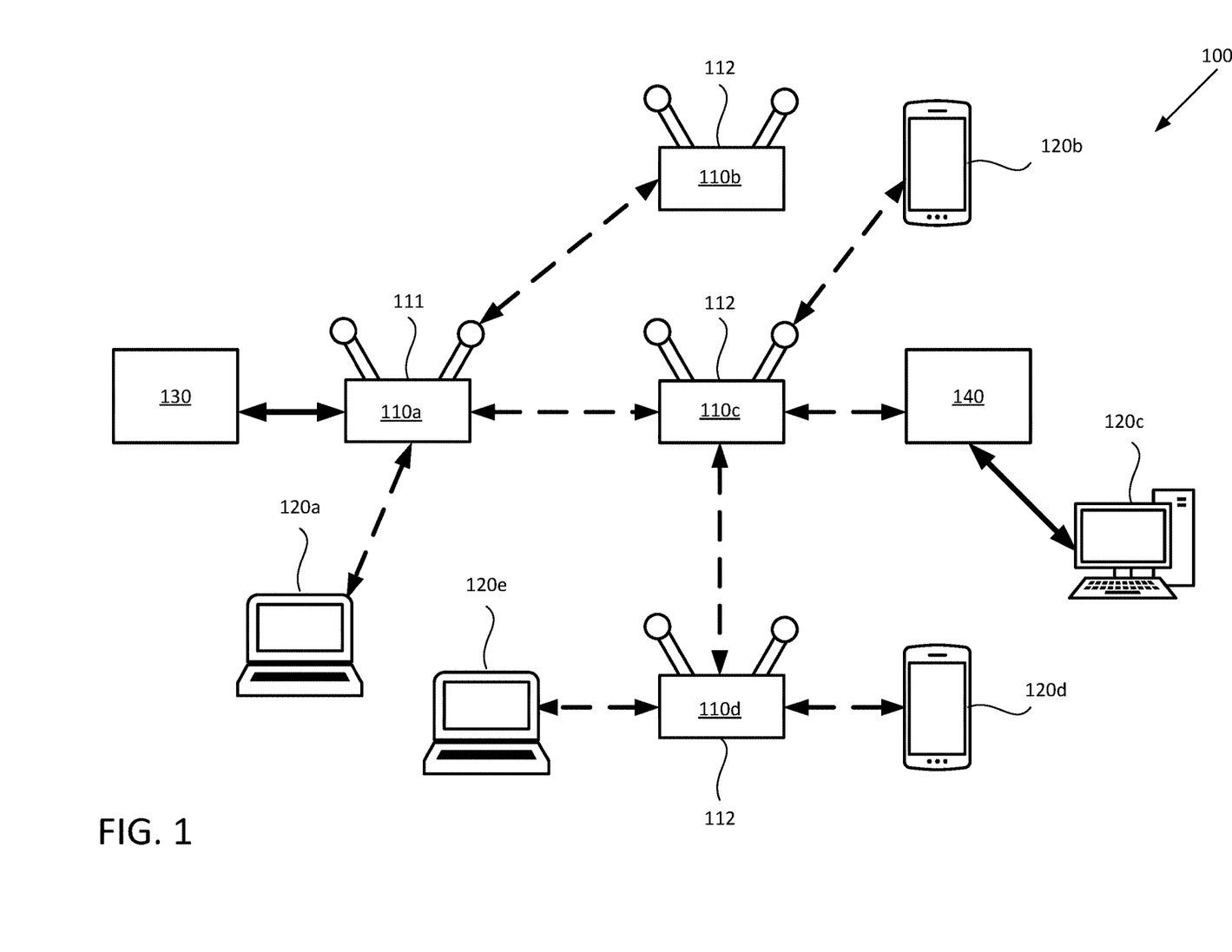
FIG. 1 illustrates an example mesh network deployment, according to embodiments of the present disclosure.

FIG. 1 illustrates an example mesh network deployment 100, according to embodiments of the present disclosure. Several APs 110a-d (generally, AP 110) provide network connectivity to one another and various User Equipment Devices (UED) 120a-c (generally, UED 120). FIG. 1 illustrates one deployment of a partially connected mesh network, and the present disclosure is applicable to other deployments with more or fewer APs 110 and UEDs 120 in different arrangements, including fully connected deployments in which every node may communicate with every other node.

An AP 110 may include various networking devices configured to provide wireless networks according to various networking standards or Radio Access Technologies (RAT) (e.g., IEEE 802.11 or "WiFi" networks, BLUETOOTH® networks, "cellular" (including various generations and subtypes thereof, such as Long Term Evolution (LTE) and Fifth Generation New Radio (5G NR)) networks, Citizens Broadband Radio Service (CBRS) networks, proprietary networks). Example hardware as may be included in an AP 110 is discussed in greater detail in regard to FIG. 5.

Similarly, a UED 120 may include any computing device that is configured to wirelessly connect to one or more APs 110. Example UED 120 can include, but are not limited to: smart phones, feature phones, tablet computers, laptop computers, desktop computers, Internet of Things (IoT) devices, and the like. Various standards may refer to a UED 120 as a client device, user equipment, mobile station (STA), or the like. Example hardware as may be included in a UED 120 is discussed in greater detail in regard to FIG. 5.

Specific APs 110 in the mesh network deployment 100 include a Root AP (RAP) 111 and one or more Mesh APs (MAP) 112. A RAP 111, such as the first AP 110a, is connected to a wireless Local Area Network (LAN) controller (WLC) 130, and provides a wired link for all of the wireless traffic over the mesh network to travel out of the network (e.g., over a wired channel to an external network, such as the Internet). The MAPs 112, such as the second through fourth APs 110b-d, provide forwarding services from UED 120 and/or other MAPs 112 to the RAP 111 and/or to other devices within the mesh network. For example, a communication pathway for the third UED 120c to an external network would include the fourth AP 110d, the third AP 110c, and the first AP 110a. In an additional example, a communication pathway for the third UED 120c to the first UED 120a would include the fourth AP 110d and the third AP 110c.

The WLC 130 manages the configuration of the APs 110 in the mesh network, to ensure that the APs 110 do not interfere with one another and that traffic is properly formatted for routing within the mesh network. In various embodiments, the WLC 130 can control the power levels at which the various APs 110 broadcast, and may assign various RUs to the APs 110 (and/or UEDs 120 associated with those APs 110) to load balance APs 110 and/or the available spectrum used by the mesh network. In various embodiments, the WLC 130 assigns the RUs for communication amongst the devices in the mesh network. In some embodiments, the WLC 130 is connected via a wired connection and/or a network switch to the RAP 111. Example hardware as may be included in a WLC 130 is discussed in greater detail in regard to FIG. 5.

In various embodiments, the UEDs 120 may be directly in communication with the APs 110, or a Work Group Bridge (WGB) 140 that provides wireless connectivity to a UED 120 connected via a wired link the WGB 140. For example, a user may connect a desktop computer that lacks an integrated wireless communications interface to a WGB 140 via an Ethernet cable to use the wireless communications interfaces of the WGB 140 to connect to a wireless network. In various embodiments, the WGB 140 may provide access to the wireless network to one or several UEDs 120, and acts as a wired access point that manages and directs the traffic to/from the various connected UEDs 120 to provide wireless access connectivity to wired clients via a single wireless connection to an AP 110. The AP 110 to which the WGB 140 wirelessly connects to treats the WGB 140 as a single wireless client regardless of the number of UEDs 120 connected by wire to the WGB 140. UEDs 120 and WGBs 130 may collectively be referred to as client devices. Example hardware as may be included in a WGB 140 is discussed in greater detail in regard to FIG. 5.

Figure 2A:
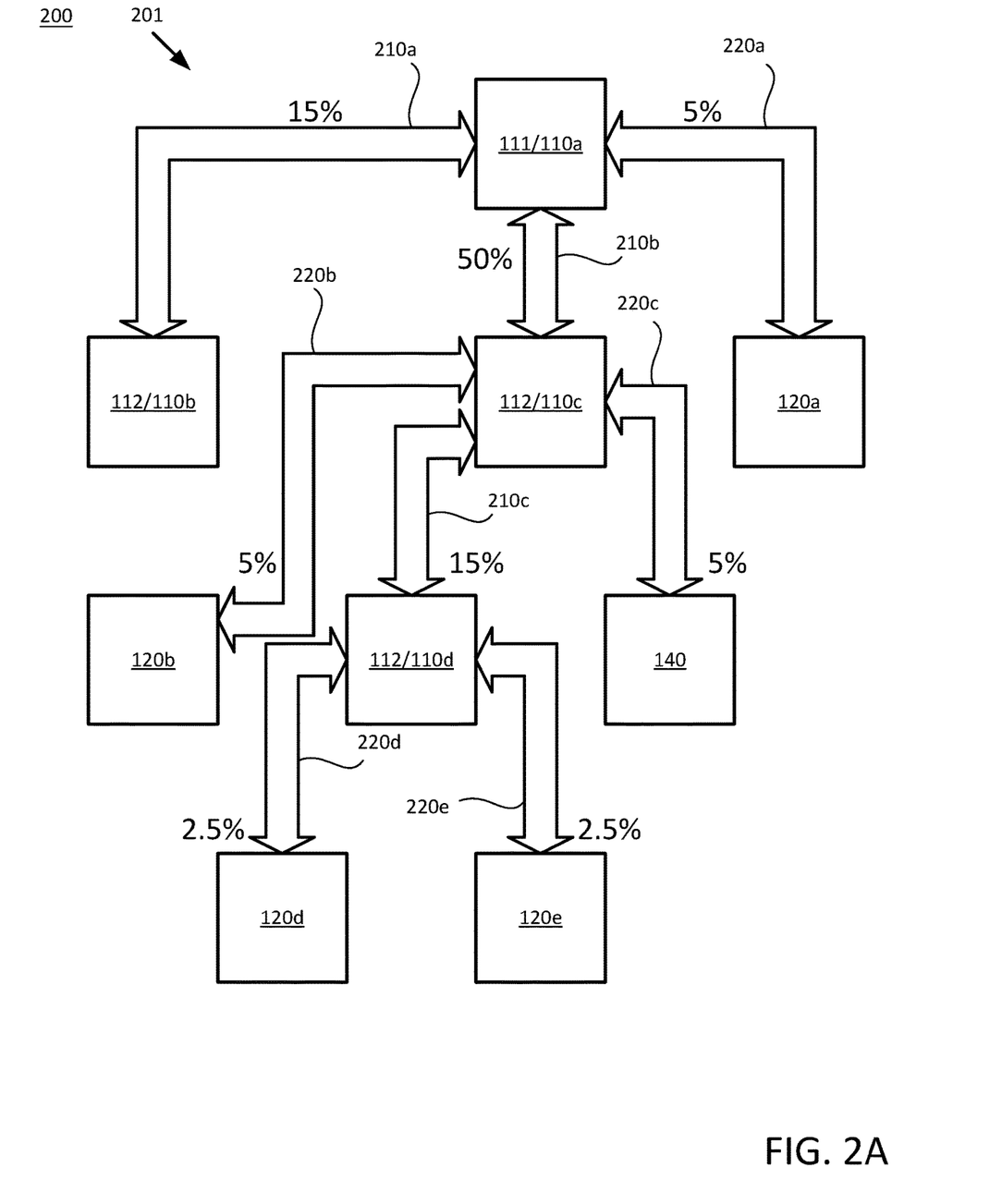
FIGS. 2A-2C illustrate a hierarchy of a mesh network, with various bandwidth allocations for wireless connections illustrated, according to embodiments of the present disclosure.
Figure 2B:
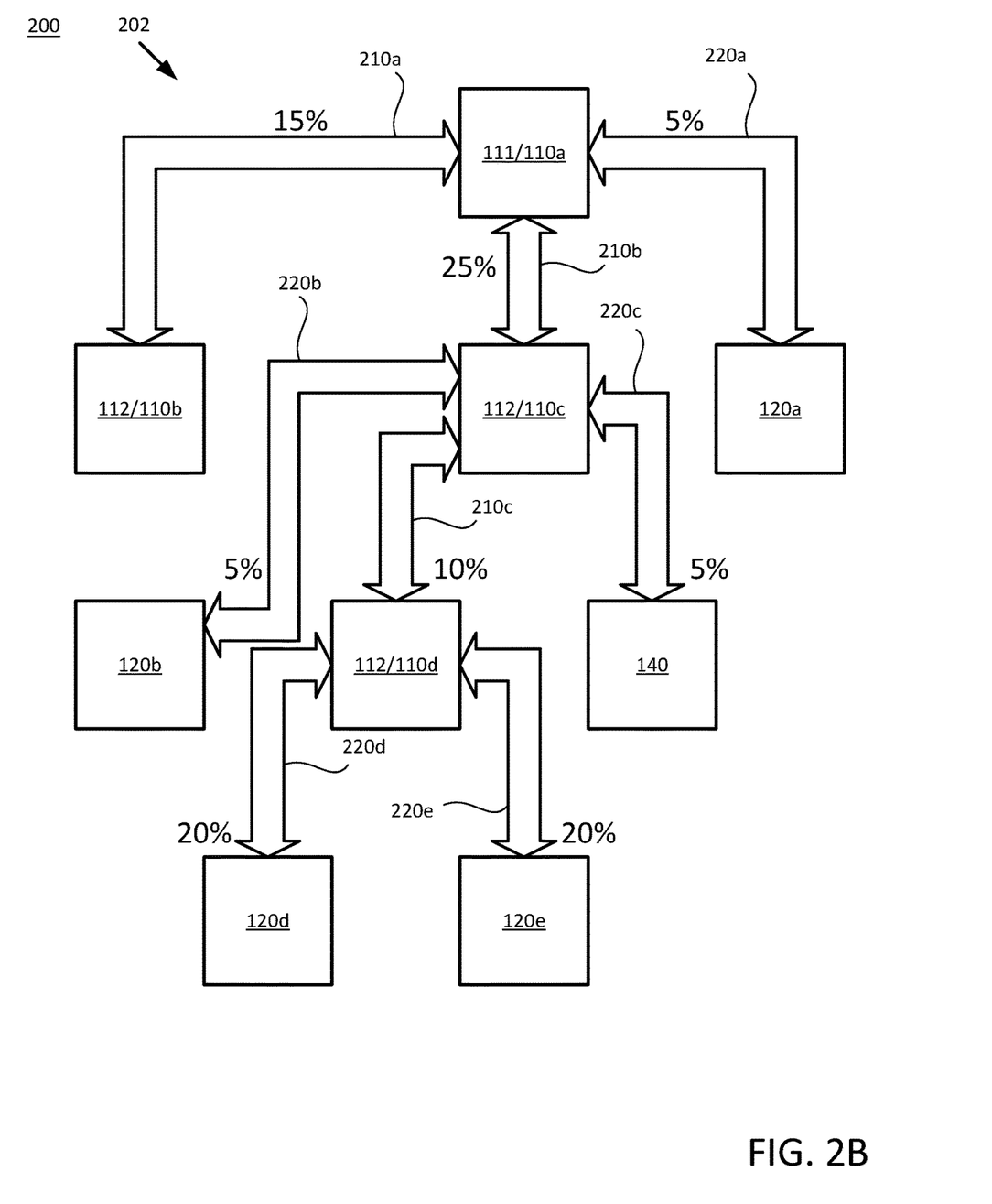
Figure 2C:
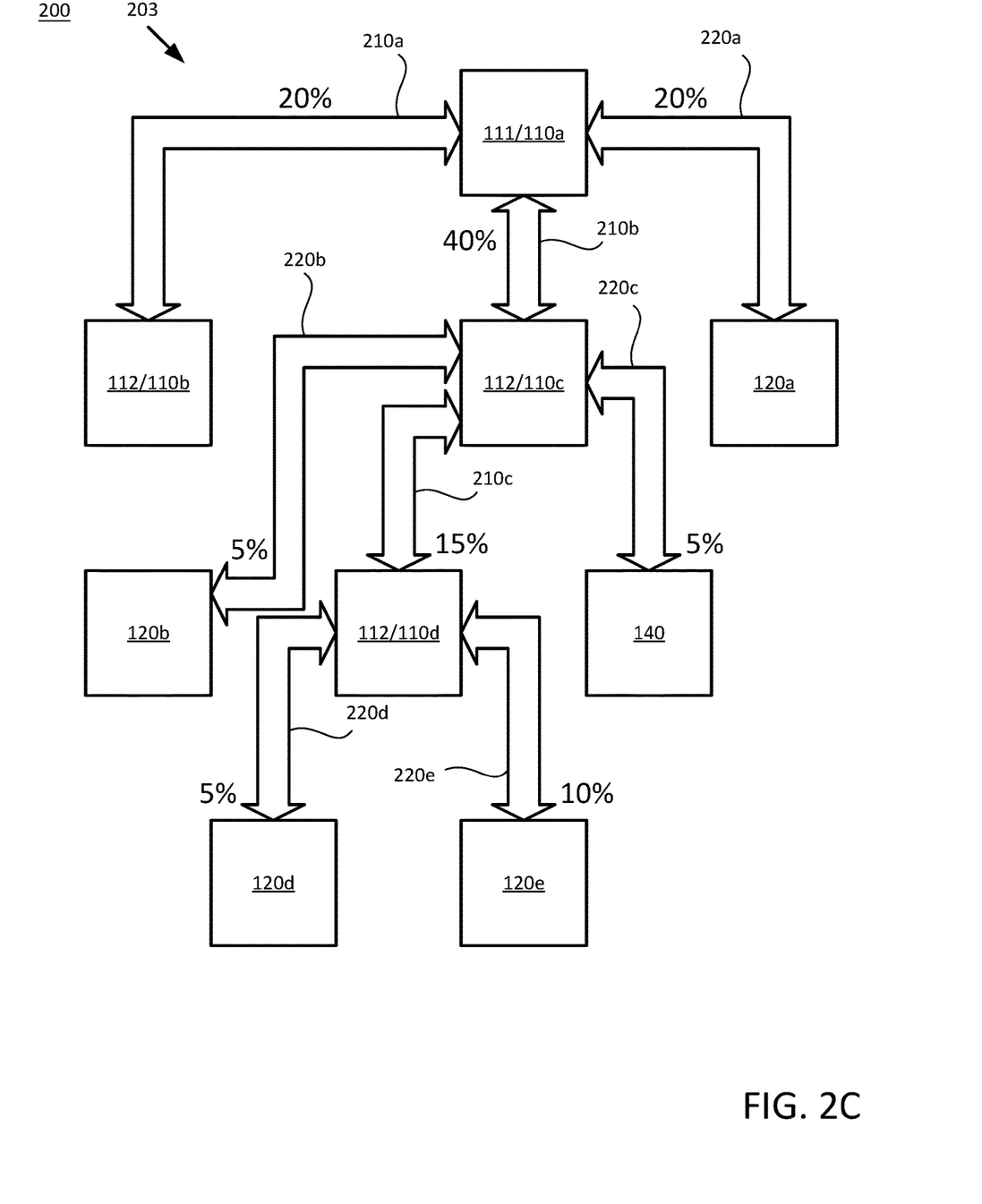

FIGS. 2A-2C illustrate a hierarchy 200 of a mesh network, based on the mesh network deployment 100 from FIG. 1, with various bandwidth allocations for wireless connections illustrated. Although illustrated as duplex connections, in various embodiments, the bandwidth allocations are provided for uplink connection and/or downlink connections. In various embodiments, a mesh network may use a first shared channel for a first directionality of connections (e.g., uplink) and a second shared channel for a second directionality of connections (e.g., downlink), and thus a single mesh network may provide several assignments for RUs on different shared channels based on the different needs of the devices for uplink or downlink communications. Additionally, when using two or more shared channels (e.g., one for uplink, two for downlink), the WLC 130 may assign different RU space percentages in the individual shared channels based on the directionality of bandwidth demanded (e.g., uplink versus downlink demand).

The connections between devices can generally be classified as backhaul connections 210a-c (generally, backhaul connection 210) between APs 110 or as access connections 220a-e (generally, access connection 220) between an AP 110 and a UED 120 or WGB 140. Access connections 220 generally carry downlink traffic (i.e., from the AP 110 to the receiving UED 120 or WGB 140) and/or uplink traffic (i.e., from the sending UED 120 or WGB 140 to the AP 110), whereas the backhaul connections 210 carry traffic between the APs 110 in the mesh network.

FIG. 2A illustrates a first RU assignment 201 providing RUs in the mesh network based on the bandwidth demands of the individual nodes. As the amount of traffic passing out of or into the mesh network is generally higher closer to the RAP 111/first AP 110a (e.g., due to aggregation of outgoing traffic and dissemination of incoming traffic), a greater amount of the RU space is generally assigned to the connections closer to the RAP 111/first AP 110a than the child nodes further from the RAP 111/first AP 110a. However, these RU assignments are not based on the hierarchy of the nodes in the mesh network, but on the relative demands for bandwidth for communication.

As shown in FIG. 2A, the RU space is assigned such that the first backhaul connection 210a is allocated 20%, the second backhaul connection 210b is allocated 40%, and the third backhaul connection is allocated 15%. Both the first backhaul connection 210a and the second backhaul connection 220a are between the first AP 110a and an AP 110 one hop therefrom (e.g., the second AP 110b and the third AP 110c, respectively), but are assigned different amounts of bandwidth based on the reported demands for bandwidth from those APs 110. The demand for bandwidth for an individual node includes measures for the priority of the traffic to be sent (e.g., based on a priority level for a user, device, or application), an amount of traffic to be sent, and the length of time traffic has been cached for transmission (e.g., a buffer fill state on a given AP 110). The individual demands for bandwidth are compared against the network-wide demands for bandwidth so that RUs are assigned holistically across the mesh network for optimal traffic flow.

FIG. 2B illustrates a second RU assignment 202 providing RUs in the mesh network based in part on the flows of traffic in the mesh network isolating traffic deep within the mesh network hierarchy. In various embodiments, backhaul connections 210 are assigned a portion of the RU space greater than or equal to the RU space assigned to downstream connections (e.g., the backhaul connections 210 and/or access connections to nodes deeper in the mesh network) based on the expectation that downstream traffic is to be carried on those backhaul connections 210. However, when some of the traffic within the mesh network is peer-to-peer and does not need to travel to the external network or an AP 110 higher in the network hierarchy, a given MAP 112 (or series of MAPs 112) may have a higher demand for bandwidth than a connection higher in the network hierarchy. Accordingly, the backhaul connection 210 to the given MAP 112 be assigned less RU space than the total downstream connections from the given MAP 112 without degrading traffic flow in the network, and potentially improving traffic flow in the network.

For example, consider the first RU assignment 201 in FIG. 2A relative to the second RU assignment 202 in FIG. 2B. In FIG. 2A, the RU assignment for the fourth access connection 220d and the fifth access connection 220e are each set at 2.5% of the RU space, whereas in FIG. 2B, the RU assignment for the fourth access connection 220d and the fifth access connection 220e are each set at 20% of the RU space. Additionally, in FIG. 2A, the RU assignment for the third backhaul connection 210c is greater than the access connections 220 from the fourth AP 110d (15%>2.5%+2.5%), and the RU assignment for the second backhaul connection 210b is greater than the total downstream connections from the third AP 110c (e.g., 50%>5%+5%+15%+2.5%+2.5%). In contrast, in FIG. 2B, the RU space allocated for the third backhaul connection 210c and the second backhaul connection 210b is less than the RU space allocated to the downstream connections (e.g., 10%<20%+20%, and 25%<5%+10%+5%+20%+20%, respectively).

The example RU assignment 202 in FIG. 2B can provide optimal traffic flow when the higher tier nodes have a lower demand for bandwidth than the lower tier nodes due to the traffic being isolated in the lower tier. For example, when the fourth UED 120d and the fifth UED 120e are sending data to one another via the fourth AP 110d, and not through the higher tiers of the mesh network (e.g., the traffic does not pass through the third AP 110c or the first AP 110a), a greater portion of the RU space can be assigned for the fourth access connection 220d and the fifth access connection 220e than the third backhaul connection 210c. Stated differently, the demand for traffic flowing between the fourth UED 120d and the fifth UED 120e does not (necessarily) place a demand for traffic flow between the fourth AP 110d and the third AP 110c (or between the third AP 110c and the first AP 110a), and thus the third backhaul connection 210c (and thereby the second backhaul connection 210b) do not need to account for that traffic unless the traffic is expected to be carried on the respective backhaul connection. Accordingly, the flow of the traffic (e.g., the source, the destination, and any intervening nodes) can also be included when determining the demands for bandwidth in the mesh network. Thereby, the WLC 130 can avoid assigning RU space to a backhaul connections 210 that are not expected to carry that traffic to a different AP 110 higher in the mesh network, thus freeing up the RU space for use by devices that can use that RU space.

FIG. 2C illustrates a third RU assignment 203 providing an over-assignment of RUs in the mesh network, based in part, on the locations and transmission ranges of the devices within the mesh network. Because RUs allow for subdivision of the shared channel, the WLC 130 is able to assign various portions of the shared channel two or more times when the devices using those portions of the shared channel are outside of signaling range of one another. For example, as in FIG. 2C, when the first UED 120a is outside of communications range with the WGB 140, the fourth UED 120d, and the fifth UED 120e, then the bandwidth used by the first UED 120a can be reused by the WGB 140, the fourth UED 120d, and/or the fifth UED 120e. Accordingly, although the WLC 130 has assigned 120% of the available bandwidth to the entire hierarchy 200, the network can be understood to describe two subsets of devices, each of which uses 100% (or less) of the bandwidth available to that subset. Because signals between the first AP 110a and the first UED 120a are not receivable by the subset of devices including the WGB 140, the fourth UED 120d, and/or the fifth UED 120e, the 20% of the available bandwidth assigned to the communications between the first AP 110a and the first UED 120a can also be used by the WGB 140, the fourth UED 120d, and/or the fifth UED 120e.

Figure 3:
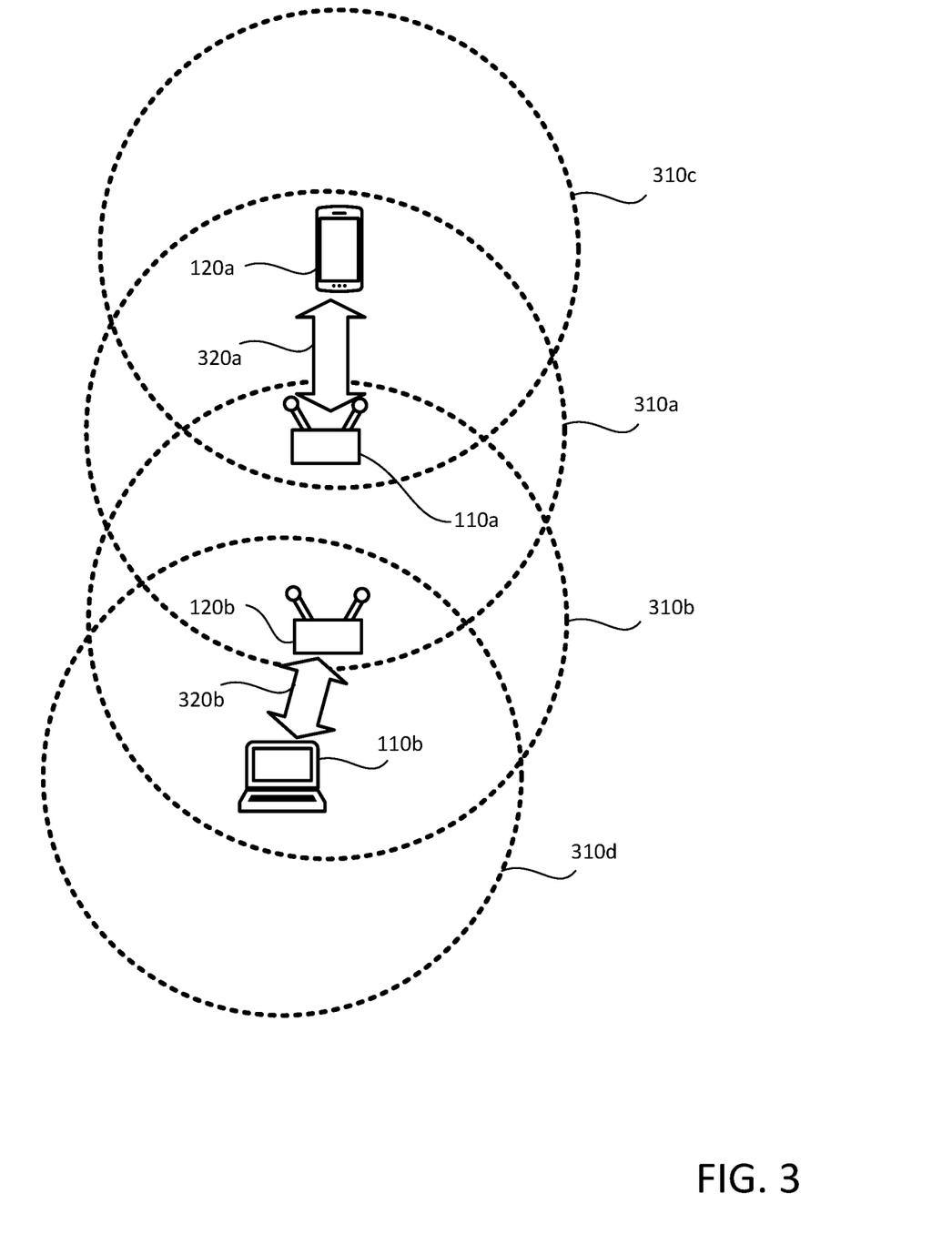
FIG. 3 illustrates signaling ranges in relation to over-assigning RUs, according to embodiments of the present disclosure.

FIG. 3 illustrates signaling ranges in relation to over-assigning RUs, according to embodiments of the present disclosure. Because the individual devices of a mesh network may be spread across a large geographic region, two or more devices located at separate locations outside of the signaling range of one another (or the intended receiving device) may use the same subcarrier of the shared channel at the same time with low or no risk of interfering with each other's communications.

As shown in FIG. 3, a first AP 110a has a first range 310a (generally, range 310) in which a second AP 110b and a first UED 120a are located, and a second UED 120b is not located. In turn, the second AP 110b has a second range 310b in which the first AP 110a and the second UED 120b are located, and the first UED 120*a* is not located. The first UED 120*a* has a third range 310*c* that does not include the second UED 120*b* or the second AP 110*b*, and the second UED 120*b* has a fourth range 310*d* that does not include the first UED 120*a* or the first AP 110*a*.

Accordingly, a first signaling pathway 320*a* (generally, signaling pathway 320) between the first AP 110*a* and the first UED 120*a* is spatially isolated or geographically distinct from a second signaling pathway 320*b* between the second AP 110*b* and the second UED 120*b*. Stated differently, due to the locations of the devices and extents of the related ranges 310, the first AP 110*a* can send and receive signals with the second AP 110*b* and the first UED 120*a*, but not the second UED 120*b*; and the second AP 110*b* can send and receive signals with the first AP 110*a* and the second UED 120*b*, but not the first UED 120*a*. Similarly, due to the locations of the devices and extents of the related ranges 310, the first UED 120*a* can send and receive signals with the first AP 110*a*, but not the second AP 110*b* or the second UED 120*b*; and the second UED 120*b* can send and receive signals with the second AP 110*b*, but not the first AP 110*a* or the first UED 120*a*.

Because the first and second signaling pathways 320 are spatially isolated from one another (e.g., the ranges 310 of the corresponding device are geographically distinct and do not overlap), the communications on the first and second signaling pathways 320 will not collide, even if sent on the same channel at the same time. Accordingly, the WLC 130 can assign the same portions of the available spectrum at overlapping times to signaling pathways 320 that are spatially isolated from one another.

In various embodiments, the extents of the ranges 310 are determined based on a signal strength threshold. Accordingly, devices "outside" of a given range 310 may still receive signals from the sending device, but the strength of the received signal is such that the receiving device can filter out, ignore, or otherwise disregard the effects of the received signal on another signal received from a different device. For example, if the first and second UEDs 120 both send a message at the same time on the same portion of the spectrum, the first and second APs 110 may each receive both messages. The strength of the message from the first UED 120*a* at the second AP 110*b* is such, however, that the second AP 110*b* can interpret the message from the second UED 120*b* without error induced by the message from the first UED 120*a*. Similarly, the strength of the message from the second UED 120*b* at the first AP 110*a* is such that the first AP 110*a* can interpret the message from the first UED 120*a* without error induced by the message from the second UED 120*b*.

Figure 4:
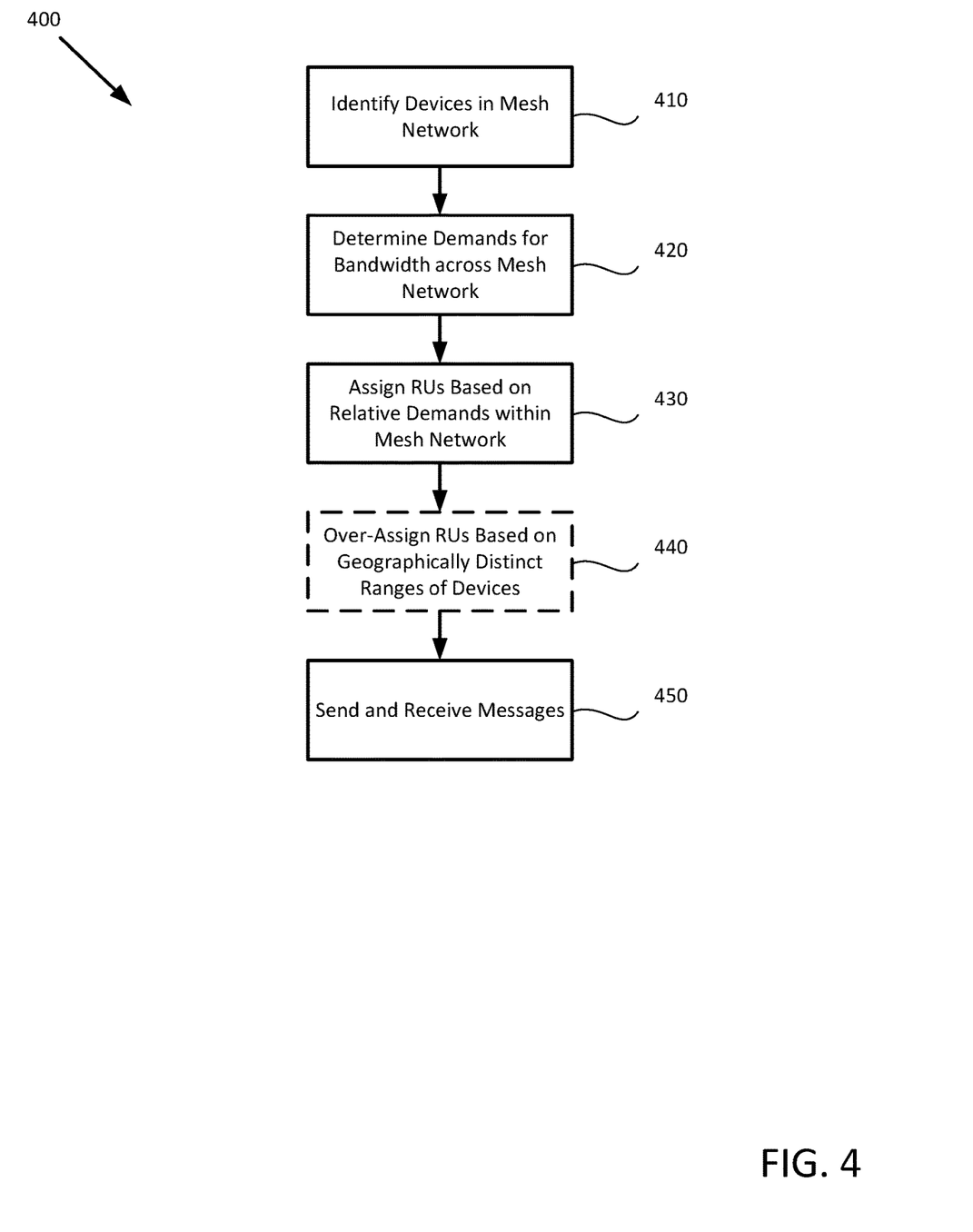
FIG. 4 is a flowchart of a method 400 for RU allocation in mesh networks, according to embodiments of the present disclosure.

FIG. 4 is a flowchart of a method 400 for RU allocation in mesh networks, according to embodiments of the present disclosure. Method 400 begins with block 410, where a WLC 130 identifies devices in a mesh network. The identified devices may include various APs 110, UEDs 120, and WGBs 140 as well as the locations and signaling ranges of those devices. The WLC 130 can periodically re-identify the devices in the mesh network, including the locations of the devices, associations between the devices. In various embodiments, the WLC 130 performs method 400 in response to a change in network conditions, including, but not limited to: a new device joining the mesh network, an existing device leaving the mesh network, devices entering or exiting sleep mode within the mesh network, an existing UED 120 handing off an association from one AP 110 to a different AP 110, a predefined amount of time passing, a buffer status of one of the devices exceeding a threshold, a change in priority level for one of the devices, etc.

At block 420, the WLC 130 determines the demands for bandwidth across the mesh network. The WLC 130 determines the individual demands for bandwidth for various APs 110 (including the demands for any associated UEDs 120 or WGBs 140) in view of the holistic or total bandwidth demands for all of the APs 110 in the mesh network to optimize throughput of the whole mesh. Accordingly, the WLC 130 identifies potential traffic bottlenecks, high-traffic nodes, low-traffic nodes, etc., based on the relative demands for bandwidth along the various signalling pathways in the mesh network so that an appropriate amount of bandwidth can be allocated to optimize the overall flow of traffic within the network.

In various embodiments, the devices in the mesh network communicate individual demands for bandwidth to the WLC 130 based on one or more of: a device/user priority level, a data consumption rate (e.g., historic, current, or estimated future), a traffic or application type (e.g., latency sensitive, latency insensitive), a buffer or cache usage rate, a traffic flow (e.g., source, destination, intervening nodes), etc. The WLC 130 aggregates the individual demands for bandwidth to identify the total demand for bandwidth within the network as well as to identify localized demand along various signalling paths (e.g., a given subset of the nodes in the mesh network, whether traffic can be isolated to a given pathway deep in the mesh network).

At block 430, the WLC 130 assigns RUs based on the relative demands for bandwidth within the mesh network. The WLC 130 assigns RUs based on the levels of traffic, the priorities of the traffic and/or devices, the amount of traffic buffered or cached, the layout of the mesh network, and previous assignments of RUs for a given device. The WLC 130 balances the individual requirements of the devices against one another to ensure optimal traffic flow across the mesh network as a whole; providing more bandwidth for some traffic and less bandwidth for other traffic. For example, the WLC 130 can assign more RUs to a first AP 110*a* than to a second AP 110*b*, even when the first AP 110*a* is lower in the network hierarchy than the second AP 110*b*, fewer devices are connected downstream from the first AP 110*a* than the second AP 110*b*, if the amount of traffic being handled by the first AP 110*a* is greater than the amount of traffic being handled or is of a higher priority that by the second AP 110*b*. Stated differently, the WLC 130 assigns RUs based on the current demand for bandwidth rather than the network hierarchy of the devices.

In various embodiments, the WLC 130 assigns the RU space for access connections 220 to each AP 110, and each AP 110 determines how to assign the allotted RUs to the associated devices or allows the associated devices to contend for a portion of the access connection 220. For example, the WLC 130 may allocate 10% of the RU space to a given AP 110 for use in access connection 220, and the given AP 110 allocates 5% of the RU space (i.e., half of the 10% allocation) to a first UED 120*a* for uplink communications, 5% of the RU space to a second UED 120*b* for downlink communications, and 0% of the RU space to a third UED 120*c* associated with the given AP 110. In a further example, the AP 110 advertises to the associated devices the RU space that has been allocated for access connections 220 by the WLC 130, and manages the contention process for access to that RU space by the associated devices. In some embodiments, the WLC 130 mandates which associated devices are given access to the allocated RU space.

As backhaul connections 210 are between two APs 110, when the WLC 130 assigns RU space for backhaul communications, the WLC 130 may mandate the direction of communication (e.g., X % of the RU space for communication from a first AP 110a to a second AP 110b) or allow the APs 110 to contend for access to the assigned RU space.

At block 440, the WLC 130 optionally over-assigns RUs to devices with geographically distinct signaling ranges. For example, when the WLC 130 in block 430 assigns a portion of the available spectrum to a first subset of the devices in the mesh network that is spatially isolated from a second subset of devices, the WLC 130 can assign the same portion of the spectrum to the second subset of devices. Because the over-assignment of RUs allows for additional traffic to flow through the network, the WLC 130 does not have to over-assign RUs (e.g., if doing so would create congestion in the network), and block 440 may be omitted from method 400.

At block 450, the WLC 130 permits the devices in the mesh network to send and receive messages according to the RU assignments. In various embodiments, the RU assignment is propagated throughout the mesh network so that each of the devices are informed which subcarriers at which times those devices are permitted to send messages or should expect to receive messages. Method 400 may then conclude.

Figure 5:
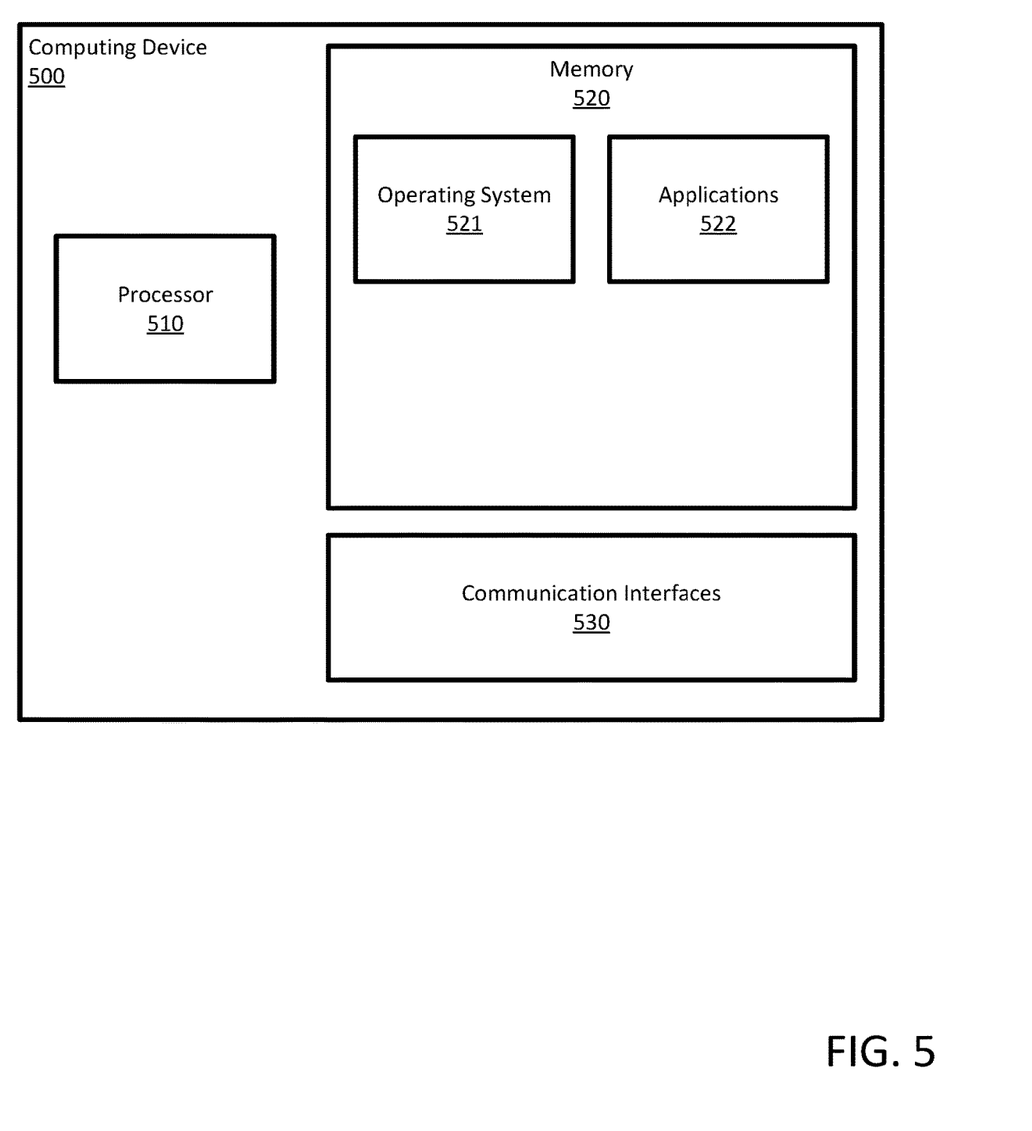
FIG. 5 illustrates hardware of a computing device, according to embodiments of the present disclosure.

FIG. 5 illustrates hardware of a computing device 500, as may be used in an AP 110, a UED 120, WLC 130, or WGB, 140 described in the present disclosure. The computing device 500 includes a processor 510, a memory 520, and communication interfaces 530. The processor 510 may be any processing element capable of performing the functions described herein. The processor 510 represents a single processor, multiple processors, a processor with multiple cores, and combinations thereof. The communication interfaces 530 facilitate communications between the computing device 500 and other devices. The communications interfaces 530 are representative of wireless communications antennas and various wired communication ports. The memory 520 may be either volatile or non-volatile memory and may include RAM, flash, cache, disk drives, and other computer readable memory storage devices. Although shown as a single entity, the memory 520 may be divided into different memory storage elements such as RAM and one or more hard disk drives.

As shown, the memory 520 includes various instructions that are executable by the processor 510 to provide an operating system 521 to manage various functions of the computing device 500 and one or more applications 522 to provide various functionalities to users of the computing device 500, which include one or more of the functions and functionalities described in the present disclosure.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
   identifying devices engaged in wireless communication over a shared channel in a mesh network, the devices including a first Access Point (AP), a second AP in wireless communication with the first AP via a first backhaul connection, and a third AP in wireless communication with the first AP via a second backhaul connection, wherein the first AP is in a first level of a network hierarchy of the mesh network, and wherein the second AP is in a second level of the network hierarchy of the mesh network, wherein the first level is higher than the second level;
   determining a first demand for bandwidth in the shared channel over the first backhaul connection and a second demand for bandwidth over the second backhaul connection; and
   assigning Resource Units (RUs) to the first backhaul connection based on the first demand relative to a total bandwidth demand for a total number of APs in the mesh network within the shared channel and to the second backhaul connection based on the second demand relative to the total bandwidth demand, wherein the total bandwidth demand includes the first demand and the second demand, and wherein fewer RUs are assigned to the first backhaul connection between the first level and the second level relative to a combination of RUs assigned to access connections at the second AP.

2. The method of claim 1, wherein the first demand includes:
   backhaul communications between the second AP to other APs in the mesh network;
   downlink communications from the second AP to client devices associated with the second AP; and
   uplink communications from the client device to the second AP.

3. The method of claim 1, further comprising:
   determining a third demand for bandwidth in the shared channel over a first access connection between the second AP and a first client device;
   assigning RUs to the first access connection based on the third demand relative to the total bandwidth demand within the shared channel; and
   wherein the total bandwidth demand includes the third demand.

4. The method of claim 1, wherein the first demand is based on:
   a number of communications queued for transmission on the second AP;
   an age of the communications queued for transmission; and
   a priority level of the communications queued for transmission.

5. The method of claim 1, wherein the second AP is in wireless communication with a first client device via a first access connection and with a second client device via a second access connection, wherein fewer RUs are assigned to the first backhaul connection than to a combination of the first access connection and the second access connection in response to identifying that communications between the first client device and the second client device do not flow to the first AP.

6. The method of claim 1, wherein the second AP is in wireless communication with a first device and the third AP is in wireless communication with a second device, wherein the RUs are assigned such that first communications between the first device and the second AP and second communications between the second device and the third AP share a given time and a given frequency when recipients of the first communications and the second communications have geographically distinct ranges from one another.

7. The method of claim 1, wherein the second AP is in wireless communication with at least one of:
   a first User Equipment Device (UED);
   a fourth AP; and
   a Work Group Bridge (WGB) in wired communication with a second UED.

8. The method of claim 1, wherein the first AP is a root AP for the mesh network.

9. A mesh network operating on a shared channel, including:
   a root Access Point (RAP) connected to a wireless controller in a first level of a network hierarchy;
   a first Mesh Access Point (MAP) in a second level of the network hierarchy and in direct communication with:
   the RAP via a first backhaul connection;
   a first user equipment device (UED) associated with the first MAP via a first access connection; and
   a second UED associated with the first MAP via a second access connection;
   a second MAP in direct communication with:
   the RAP via a second backhaul connection; and
   wherein the wireless controller is configured to:
   assign Resource Units (RUs) for the first backhaul connection, the second backhaul connection, the first access connection, and the second access connection based on relative transmission needs for individual connections of the first backhaul connection, the second backhaul connection, the first access connection, and the second access connection relative to a total bandwidth demand for a total number of access points (APs) in the mesh network including the first backhaul connection, the second backhaul connection, the first access connection, and the second access connection, and wherein fewer RUs are assigned to the first backhaul connection between the first level and the second level relative to a combination of RUs assigned to first access connection and the second access connection.

10. The mesh network of claim 9, wherein a greater number of RUs are assigned over a combination of the first access connection and the second access connection than the first backhaul connection based on a traffic flow between the first UED and the second UED not including the RAP.

11. The mesh network of claim 9, wherein the wireless controller is further configured to reassign RUs over the shared channel at a later time period based on an
updated demand for data transmission in response to at least one of:
 a predefined amount of time passing;
 a new device joining the mesh network;
 an existing device leaving the mesh network; and
 a buffer status report for the first MAP exceeding a threshold.

12. The mesh network of claim 9, wherein the second MAP is connected to a third UED via a third access connection and a greater number of RUs are assigned for the third access connection than either of the first access connection or the second access connection based on the third UED demanding more bandwidth than either the first UED or the second UED.

13. The mesh network of claim 9, wherein the wireless controller over-assigns the RUs such that a first RU assigned to the first access connection and a second RU assigned to a third access connection between the second MAP and a third UED are transmitted during a shared time on a shared subcarrier.

14. The mesh network of claim 9, wherein the shared channel is used for uplink communications and where a second shared channel is used for downlink communications.

15. A Wireless Local Area Network (LAN) Controller (WLC), comprising:
 a processor; and
 a memory storage device including instructions that when executed by the processor enable the WLC to:
  receive demand information from a plurality of Access Points (APs) comprising a mesh network; and
  assign Resource Units (RU) to the plurality of APs based on the demand information and individual bandwidth demands from individual APs of the plurality of APs relative to a total bandwidth demand for a total number of APs in the mesh network including bandwidth demand from the plurality of APs, wherein a first AP of the plurality of APs is in first level a of a network hierarchy of the mesh network, and wherein a second AP of the plurality of APs is in a second level of the network hierarchy, wherein the first level is higher than the second level, and wherein fewer RUs are assigned to a backhaul connection between the first AP in the first level and the second AP in the second level relative to a combination of RUs assigned to access connections at the second AP.

16. The WLC of claim 15, wherein the instructions, when executed by the processor, further enable the WLC to over-assign RUs to the plurality of APs when receiving devices for communications using a shared portion of spectrum at a shared time are spatially isolated from one another.

17. The WLC of claim 15, wherein the individual bandwidth demand for the backhaul connection between the first AP and the second AP of the plurality of APs is less than a combined bandwidth demand for access connections for the first AP when associated devices using the access connections are sending traffic that is not carried by the backhaul connection.

18. The WLC of claim 15, wherein the plurality of APs include a single root AP (RAP) and a plurality of mesh APs (MAPs), wherein the RAP is connected to an external network via a wired connection and wireless connected to at least one MAP of the plurality of MAPs via a backhaul connection, and each MAP of the plurality of MAPs is wireless connected to at least one MAP of the plurality of MAPs or the RAP via a corresponding backhaul connection.

19. The WLC of claim 15, wherein the demand information include at least one of:
 an amount of data requiring transmission;
 a priority of the data; and
 an age of the data.

20. The WLC of claim 15, wherein the RUs used for uplink communications are assigned on a first shared channel in the mesh network and wherein the RUs used for downlink communications are assigned on a second shared channel in the mesh network.

* * * * *